United States Patent Office 3,641,174
Patented Feb. 8, 1972

3,641,174
DIOLEFIN DISPROPORTIONATION REACTIONS
James E. Lyons, Wallingford, Pa., assignor to Sun Oil Company, Philadelphia, Pa.
No Drawing. Filed Mar. 7, 1969, Ser. No. 805,343
Int. Cl. C07c 1/00
U.S. Cl. 260—666 A                6 Claims

ABSTRACT OF THE DISCLOSURE

Cyclic, semicyclic or acyclic diolefins can be disproportionated to simultaneously form one hydrogenated and one dehydrogenated product through the use of a ligand-stabilized Group VIII transition metal complex in homogeneous solution. These catalyst complexes, which are hydrocarbon-soluble, uniquely provide a homogeneous rather than a heterogeneous catalyst system for this type of reaction.

BACKGROUND OF THE INVENTION

This invention relates to an improved process for disproportionating diolefin compounds. More particularly, this invention relates to a process for disproportionating cyclic, semicyclic or acyclic diolefins wherein there is employed as the disproportionation catalyst a homogeneous system comprising a ligand-stabilized Group VIII transition metal complex which is hydrocarbon-soluble.

The disproportionation of cyclic diolefins and like compounds to simultaneously form a hydrogenated and dehydrogenated product is already well known in the art. Thus, for example, Canadian Pat. 786,395 teaches the disproportionation of dihydrobenzenes to form cyclohexene and benzene, using metals of Group VIII as the catalyst. Similarly, U.S. Pat. 3,287,427 discloses the disproportionation of cyclic olefins with platinum metal halide catalysts to simultaneously form various saturated and unsaturated products.

However, in each of these patents, as well as other like patents which teach the use of Group VIII metal catalysts, there is consistently formed a heterogeneous catalyst system rather than a homogeneous system. Thus, in each patent either an insoluble metal catalyst is employed from the start, or as in the case of U.S. Pat. 3,287,427, palladium metal is precipitated in situ. By contrast, a homogeneous catalyst system is more advantageous than a heterogeneous system, particularly when liquid phase catalysis is desired in that a two-phase system is avoided, including supports for the catalyst and the like, as well as avoidance of the handling, separation, recovery and regeneration of a solid catalyst, with or without a support.

Moreover, unlike the present process wherein the hydrogenated product consistently stops at the mono-olefin, the catalysts of the prior are most often form less desirable saturated products or mixtures thereof with mono-olefins.

SUMMARY OF THE INVENTION

In accordance with the present invention, it has now been found that a homogeneous catalyst system comprising a ligand-stabilized, hydrocarbon-soluble Group VIII metal complex may be employed in the disproportionation of cyclic, semicyclic and acyclic diolefins to form a corresponding hydrogenated and a dehydrogenated compound.

The novel features of this process, as distinguished from the prior art, are: (1) the reaction proceeds in homogeneous solution in the presence of a soluble Group VIII metal complex rather than in a heterogeneous system with insoluble catalysts; and (2) the reaction is selective in that the hydrogenation consistently does not proceed beyond the formation of the mono-olefin, i.e. saturated compounds are not formed as in known heterogeneous systems.

DESCRIPTION OF THE INVENTION

As mentioned above, the starting materials employed in this process include cyclic diolefins, such as 1,4-cyclohexadiene, 1,4-cycloheptadiene and the like; semicyclic diolefins, i.e. unsaturated cyclic compounds wherein one of the double bonds is on a side chain attached to the unsaturated ring, said side chain containing from 2 to 6 carbon atoms, as for example, 4-vinylcyclohexene, 4-propenylcyclohexene and the like; and acyclic diolefins such as cis-1,4-hexadiene and the like.

Each of the above classes of compounds may contain substituent groups which are non-reactive under the conditions of this process. Thus, alkyl groups as well as oxygen- or nitrogen-containing functionalities such as —OR, —OCOR, —NR$_2$, —NO$_2$ or like moieties, wherein R is a lower alkyl group having from 1 to 6 carbon atoms, may be attached to the unsaturated ring, or to the alkyl-side chains thereof.

Representative unsaturated side chains which may be attached to the semi-cyclic diolefins defined above include not only vinyl or other alkyl groups, but also such substituents as propenyl, ethynyl groups and the like.

In addition to the mono-nuclear unsaturated ring compounds illustrated above, there may also be employed as starting materials in this process such polynuclear cyclic olefins as dihydronaphthalene, dihydroanthracene, tetrahydroanthracene and the like.

The only limitation that is imposed on the structure of the starting material is that there must be sites available in the diene structure to permit hydrogen transfer. In this regard, it is preferred that the dienes be non-conjugated, although it will be understood that conjugated systems containing certain electron-withdrawing groups adjacent thereto may also be employed.

The catalysts for the disproportionation reaction are hydrocarbon-soluble, four-coordinate, square planar, co-ordinatively unsaturated $d^6$, $d^8$ or $d^{10}$ transition metal complexes of the formula:

$$(LR_3)_q(CO)_rX_sM$$

wherein L is phosphorus or arsenic; R is lower alkyl or mononuclear aryl; X is chlorine, bromine or iodine; M is a Group VIII transition metal; $q$ is an integer of from 2 to 4; $r$ is an integer of from 0 to 2; and $s$ equals the valence of the Group VIII metal, M. Preferably, LR$_3$— should be a triarylphosphine moiety, and $q$ should have a value of 2 or 4. By the terms $d^6$, $d^8$ or $d^{10}$ is meant the number of electrons in the $d$ orbital of the Group VIII metal atom.

Among the suitable Group VIII metals are cobalt, nickel, palladium, iridium, and rhodium, of which iridium is preferred.

Examples of some of the catalysts found effective in this process are bistriphenylphosphinecarbonylchloroiridium, bistriphenylphosphinecarbonyliodoridium, bistriphenylphosphinecarbonylchlorhodium, bistriphenylphosphinenickeldicarbonyl, bistriphenylphosphinepalladiumdichloride, tetrakistriphenylphosphinepalladium, the corresponding arsine compounds and the like. Of these, bistriphenylphosphinechlorocarbonyliridium is the catalyst of choice.

These and other like Group VIII transition metal complexes are known compounds as shown in J. P. Collman, Accounts of Chemical Research, vol. I, pp. 136 to 143 (1968). These complexes may easily be prepared by simply reacting a suitable Group VIII metal halide with a triaryl or trialkylphosphine or arsine in an alcoholic solvent such as methanol, and recovering the resulting complex therefrom.

In carrying out the process of this invention, the amount of catalyst employed should be in the range of from 0.1 mg. to 10 mgs. per gram of starting material, and preferably from 1 to 2 mgs. Although no solvent is necessary, inasmuch as the catalyst is generally soluble in the hydrocarbon starting material, nevertheless, inert organic solvents such as toluene, benzene, cyclohexane or heptane may be employed if desired.

The disproportionation reaction may conveniently be conducted by dissolving the catalyst in the hydrocarbon under an inert atmosphere such as nitrogen for a period of from about 20 to 200 hours at temperatures ranging from about 80° C. to the reflux temperature of the olefin starting material. Since the catalysts are stable at temperatures up to about 120° C., it is possible to employ temperatures in this elevated range, thereby achieving increased reaction rates.

The products may readily be recovered from the reaction mixture by known methods. Thus, for example, if the products are volatile, they may be separated and recovered by distillation during the course of the reaction. Alternatively, if the products are not volatile, they may be recovered by the normal methods of fractionation, distillation, crystallization or the like after completion of the reaction.

An important advantage of this process, as noted above, is the fact that of the two products, one of which becomes hydrogenated, the other dehydrogenated, the former compound does not become a fully saturated compound, but rather selectively forms only the mono-olefin, thereby yielding a commercially more valuable product than would be the corresponding saturated compound. By way of example, when 1,4 - cyclohexadiene is disproportionated, there is obtained benzene and cyclohexene, along with some 1,3-cyclohexadiene which has been isomerized as a side reaction to this process. Similarly, when 1-methyl-1,4-cyclohexadiene or 4-vinylcyclohexene is reacted in accordance with the process of this invention, there are obtained the corresponding toluene and methyl cyclohexenes in the former case, and ethylbenzene and ethyl cyclohexenes in the latter case, but in no instance are saturated cyclic compounds formed.

In a further embodiment of this process, it has been found that when semicyclic compounds are disproportionated in accordance with this method, there takes place, in addition to the usual hydrogenation and dehydrogenation, an isomerization reaction which produces compounds containing an exocyclic double bond in a position on the side chain differing from that of the starting material. For example, in the case of 4-vinylcyclohexene, there is produced not only ethylbenzene and the ethyl cyclohexenes, but also the corresponding isomeric ethylidene cyclohexenes.

The invention will be further illustrated by the following examples. Unless otherwise specified, all parts and percentages are given by weight.

EXAMPLE I

A series of runs were carried out whereby 1,4-cyclohexadiene was disproportionated using the catalysts and reaction conditions set forth in Table I below. In each case the reaction was carried out in a standard glass apparatus in an atmosphere of nitrogen. The diene (4 ml.) was freed of dissolved oxygen and traces of hydroquinone stabilizer by vacuum transfer into the reaction vessel containing 0.1 percent by weight, based on the weight of the starting material of the catalyst. The mixture was then warmed by immersion of the flask in a heated oil bath at the indicated temperature, and stirred magnetically for the desired length of time. The product mixtures were analyzed by gas chromatography, with the following results:

TABLE I

| Catalyst | Reaction time (hours) | Temperature (° C.) | Disproportionation, percent | Isomerization, percent |
|---|---|---|---|---|
| (PPh$_3$)$_2$Ir(CO)Cl | 40 | 88 | 15 | 7 |
| (PPh$_3$)$_2$Ir(CO)Cl | 90 | 85 | 30 | 8 |
| (PPh$_3$)$_2$Ir(CO)Cl | 185 | 90 | 60 | 7 |
| (PPh$_3$)$_2$Ir(CO)I | 90 | 90 | 12 | 5 |
| (PPh$_3$)$_2$Rh(CO)Cl | 92 | 90 | 20 | 1.5 |
| (PPh$_3$)$_3$RhCl | 90 | 90 | >1 | 10 |
| (PPh$_3$)$_2$PdCl$_2$ | 41 | 92 | 20 | 0.1 |
| (PPh$_3$)$_4$Pd | 90 | 90 | 25 | |
| (PPh$_3$)$_2$Ni(CO)$_2$ | 90 | 90 | 6 | 0.1 |
| (PPh$_3$)$_2$Ir(CO)ClH$_2$ | 115 | 90 | 7 | 11 |

EXAMPLE II

In accordance with the procedures of Example I but substituting 1 - methyl, 4-cyclohexadiene, and utilizing bistriphenylphosphinecarbonylchloroiridium as the catalyst, there was obtained after 180 hours of heating by immersion in an oil bath at 95° C. the following products; toluene, 10%; 1-methylcyclohexene, 6%; 4-methylcyclohexene, 3%; 3-methylcyclohexene, 1%; 1-methyl-1,3 - cyclohexadiene, 22%; 2-methyl-1,3-cyclohexadiene, 9%; and 5-methyl - 1,3 - cyclohexadiene, 3%. The remainder of the material, 44%, was unreacted 1-methyl-1,4-cyclohexadiene. The products of this reaction were separated by gas chromatography and their structure established by their IR, UV and NMR spectra.

In accordance with the foregoing procedure, but substituting 1-methoxy-1,4-cyclohexadiene for 1-methyl-1,4-cyclohexadiene, there is obtained a mixture of the corresponding methoxybenzene and isomeric methoxycyclohexenes.

EXAMPLE III

In accordance with the procedures of Example I but substituting 4 - vinylcyclohexene-1 and utilizing bistriphenylphosphinecarbonylchloroiridium as the catalyst, there was obtained after 200 hours at 110° C., toluene, 5%; ethylcyclohexene, 5%; and a mixture of isomeric ethylidenecyclohexenes, which were formed in 80% yield. Identification of the products was made, as in previous examples, using gas chromatography in connection with IR, NMR, and UV spectral data.

EXAMPLE IV

In accordance with the procedures of Example I but substituting an equimolar mixture of cis- and trans-1,4-hexadiene and utilizing bistriphenylphosphinecarbonyl-chloroiridium as the catalyst, there was obtained after 150 hours at 80° C., a mixture of disproportionation products (hexatriene and hexenes) and isomerization products (conjugated hexadienes) totaling 20%.

EXAMPLE V

In accordance with the procedures of Example I, when 1,4-cyclohexadiene was heated at 90° C. for 70 hours in the presence of bistriphenylarsinecarbonylchloroiridium, there was obtained a 12% conversion of starting material comprising 6% disproportionation products, including benzene and cyclohexene, and 6% isomerized products, chiefly 1,3-cyclohexadiene.

What is claimed is:
1. A process for the disproportionation of cyclic, semicyclic or acyclic diolefins which comprises contacting said diolefins at a temperature not greater than the catalyst decomposition temperature with a catalyst consisting essentially of a hydrocarbon-soluble, four-coordinate, square planar, coordinatively unsaturated $d^6$, $d^8$ or $d^{10}$ transition metal complex of the formula

$$(LR_3)_q(CO)_rX_sM$$

wherein L is phosphorus or arsenic; R is lower alkyl or mono-nuclear aryl; X is chlorine, bromine or iodine; M is a Group VIII transition metal; $q$ is an integer of from 2 to 4; $r$ is an integer of from 0 to 2; and $s$ equals the valence of the Group VIII metal, M, wherein said acyclic diolefins have at least 6 carbon atoms, and said cyclic and semicyclic diolefins have from 5 to 8 ring carbon atoms, said semicyclic diolefins further having from 2 to 6 carbon atoms on their side chains.

2. The process according to claim 1 wherein the $LR_3$- moiety is a triarylphosphine; $q$ has a value of 2 or 4; and M is iridium.

3. The process according to claim 1 wherein the catalyst is bistriphenylphosphinecarbonylchloroiridium, bistriphenylphosphinecarbonyliodoiridium, bistriphenylphosphinecarbonylchlororhodium, bistriphenylphosphinenickeldicarbonyl, bistriphenylphosphinepalladiumdichloride, or tetrakistriphenylphosphinepalladium.

4. The process according to claim 1 wherein 1,4-cyclohexadiene is disproportionated to form benzene and cyclohexene.

5. The process according to claim 1 wherein 4-vinylcyclohexene is disproportionated and isomerized to form toluene, ethylcyclohexene and an isomeric mixture of ethylidenecyclohexenes.

6. The process according to claim 1 wherein an equimolar mixture of cis- and trans-1,4-hexadiene is disproportionated and isomerized to form hexatriene, hexenes and conjugated hexadienes.

References Cited

UNITED STATES PATENTS

| | | | |
|---|---|---|---|
| 3,514,497 | 5/1970 | Hughes | 260—666 |
| 3,287,427 | 11/1966 | Karol et al. | 260—666 A |
| 3,458,547 | 7/1969 | Coffey | 260—666 A |
| 3,310,591 | 3/1967 | Zuech | 260—666 B |
| 3,379,706 | 4/1968 | Wilke | 260—666 B |

DELBERT E. GANTZ, Primary Examiner

V. O'KEEFE, Assistant Examiner

U.S. Cl. X.R.

260—680 R